(12) United States Patent
Pang et al.

(10) Patent No.: US 11,431,521 B2
(45) Date of Patent: Aug. 30, 2022

(54) INSTALLATION OF BUILDING AUTOMATION DEVICES

(71) Applicant: ABB AG, Mannheim (DE)

(72) Inventors: Zhibo Pang, Vaesteras (SE); Gargi Bag, Vaesteras (SE); Morgan Johansson, Vaesteras (SE)

(73) Assignee: ABB AG, Mannheim (DE)

( * ) Notice: Subject to any disclaimer, the term of this patent is extended or adjusted under 35 U.S.C. 154(b) by 290 days.

(21) Appl. No.: 15/995,141

(22) Filed: Jun. 1, 2018

(65) Prior Publication Data
US 2018/0278433 A1 Sep. 27, 2018

Related U.S. Application Data

(63) Continuation of application No. PCT/EP2015/078379, filed on Dec. 2, 2015.

(51) Int. Cl.
H04L 12/28 (2006.01)
H04W 4/33 (2018.01)
H04L 29/08 (2006.01)
H04W 64/00 (2009.01)
H04L 12/24 (2006.01)
H04M 1/72409 (2021.01)
(Continued)

(52) U.S. Cl.
CPC ........ *H04L 12/2814* (2013.01); *H04L 12/281* (2013.01); *H04L 12/2807* (2013.01); *H04L 12/2838* (2013.01); *H04L 41/0803* (2013.01); *H04L 41/22* (2013.01); *H04L 63/0876* (2013.01); *H04L 67/18* (2013.01); *H04M 1/72409* (2021.01); *H04W 4/33* (2018.02); *H04W 64/00* (2013.01)

(58) Field of Classification Search
CPC .. H04L 41/0806; H04L 41/145; H04W 16/18; H05B 37/0245
See application file for complete search history.

(56) References Cited

U.S. PATENT DOCUMENTS 8,437,276 B2 5/2013 Dinur
2009/0045939 A1* 2/2009 Holland ................ H04W 24/00 340/524

(Continued)

FOREIGN PATENT DOCUMENTS

EP 2945407 A1 11/2015
WO WO 2009069118 A2 6/2009
WO WO 2012052890 A1 4/2012

*Primary Examiner* — Philip J Chea
*Assistant Examiner* — Mohammed Ahmed
(74) *Attorney, Agent, or Firm* — Leydig, Voit & Mayer, Ltd.

(57) ABSTRACT

A method performed by a wireless terminal for installation of Building Automation (BA) devices in a building includes: determining, using a localization application in the wireless terminal, a current location of the wireless terminal in the building; from a BA device database, obtaining an identifier for each of a plurality of the BA devices which should be installed in a vicinity of the determined location of the wireless terminal; presenting a list of the obtained identifiers in a user interface of the wireless terminal; after the presenting, receiving input via the user interface; and in response to the received input, associating at least a first of the plurality of BA devices with at least a second of the plurality of BA devices.

15 Claims, 1 Drawing Sheet

(51) Int. Cl.
  *H04L 29/06*      (2006.01)
  *H04L 67/52*      (2022.01)
  *H04L 41/22*      (2022.01)
  *H04L 41/0803*    (2022.01)
  *H04L 9/40*       (2022.01)

(56) References Cited

U.S. PATENT DOCUMENTS

| | | | |
|---|---|---|---|
| 2011/0007665 A1* | 1/2011 | Dinur | H04L 41/0806 370/254 |
| 2013/0211780 A1* | 8/2013 | Meador | G01S 5/14 702/158 |
| 2014/0153438 A1 | 6/2014 | Mahasenan et al. | |
| 2014/0344062 A1* | 11/2014 | Lamont | H04W 4/80 705/14.64 |
| 2015/0198938 A1* | 7/2015 | Steele | G05B 15/02 700/275 |
| 2015/0306409 A1* | 10/2015 | Greiner | A61N 1/3925 607/7 |
| 2016/0327293 A1* | 11/2016 | Grabowski | F24F 11/30 |

\* cited by examiner

INSTALLATION OF BUILDING AUTOMATION DEVICES

CROSS-REFERENCE TO PRIOR APPLICATION

This application is a continuation of International Patent Application No. PCT/EP2015/078379, filed on Dec. 2, 2015, the entire disclosure of which is hereby incorporated by reference herein.

FIELD

The present disclosure relates to a method and device for installation of Building Automation (BA) devices of a Building Automation System (BAS) in a building.

BACKGROUND

In a BAS of a building it is necessary to configure wired and/or wireless devices manually based on their locations so that the Building Management System (BMS) can pair/associate the device with the room it is in or with other devices in the same or different location depending on the application requirement. For instance, the BMS needs to know which room a heating or lighting device relates to. Also, the device is assigned a name/address within the BAS to enable communication there with. Thus, a lot of time is needed to set up all devices in a BAS. There is thus a general need to ease the installation and commissioning of devices in a BAS.

Building/home automation devices are intended to enable energy efficiency, provide comfort and security to the residents of the building. Commissioning of BA devices in terms of assigning them to correct network, pairing of devices, providing them necessary security credentials etc. can be a challenging task for an installer especially if there are a large number of devices. While there are many kinds of building automation devices based on different standards, the standards does not specify commissioning procedure and it is left primarily to the installer and the commissioning tools provided by the device manufacturer of the BA devices.

US 2014/153438 discloses receiving data from a node in a node array with a locating device, determining a position of the locating device, determining a position of the node in relation to the locating device based on the data received from the node and the position of the locating device, comparing the position of the node to a defined layout of the node array, and determining whether the position of the node matches a defined position in the defined layout of the node array. An individual can walk through a structure with a locating device that collects data from the nodes and uses the data to determine the location of the nodes. A determination can then be made whether the nodes have been installed according to a designed network topology. The position of the locating device can be determined through an indoor navigation system or cellular communication network. Thus, the document discloses the use of a locating device with knowledge of its own position for determining whether an already installed network of nodes is geographically set up in accordance with a planned topology.

U.S. Pat. No. 8,437,276 discloses a commissioning tool in the form of a portable unit for deploying and configuring devices for wireless and wired networks design, installation and automatic formation, including logically binding of the networks devices. According to devices' physical locations, appropriate configuration data is loaded from the commissioning tool into the devices through dedicated configuration adapters. The master controller in the control system uses the design system defined binding information and transmits binding commands for creating logical links between the devices to automatically form networks. Thus, the document discloses configuring and linking of nodes of a network, based on geographical locations of the nodes by means of a portable commissioning tool.

Commissioning large number of BA devices can be a daunting task for the installer, considering that he/she needs to know which kind of device in terms of functionality and technology will be placed where in the building. Beside this, he/she needs to know which devices should be paired with each other and may also need to know what updates in terms of security credentials, for example, are required for each device at the time of commissioning or maintenance.

SUMMARY

In an embodiment, the present invention provides a method performed by a wireless terminal for installation of Building Automation (BA) devices in a building, the method comprising: determining, using a localization application in the wireless terminal, a current location of the wireless terminal in the building; from a BA device database, obtaining an identifier for each of a plurality of the BA devices which should be installed in a vicinity of the determined location of the wireless terminal; presenting a list of the obtained identifiers in a user interface of the wireless terminal; after the presenting, receiving input via the user interface; and in response to the received input, associating at least a first of the plurality of BA devices with at least a second of the plurality of BA devices.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
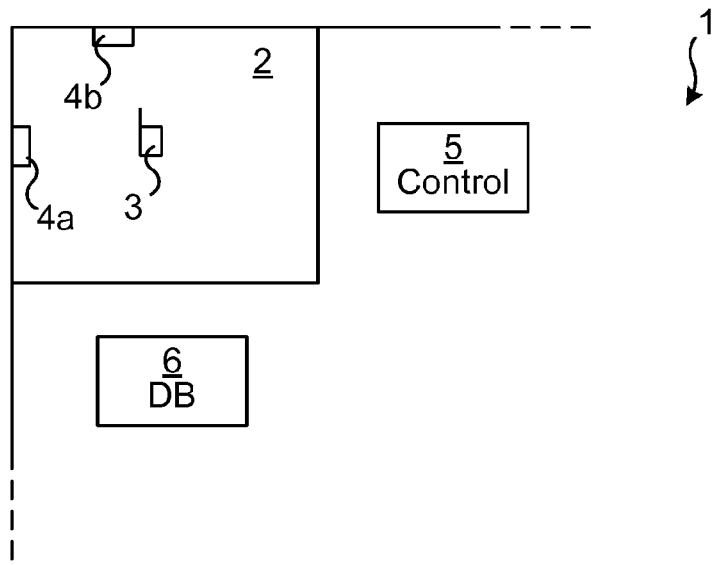
FIG. 1 is a schematic block diagram of an embodiment of a building with BA devices, in accordance with the present invention.

According to an aspect of the present invention, there is provided a method performed by a wireless terminal for installation of Building Automation (BA) devices in a building. The method comprises, by means of a localization application in the wireless terminal, determining a current location of the wireless terminal in the building. The method also comprises, from a BA device database, obtaining an identifier for each of a plurality of the BA devices which should be installed in the vicinity of the determined location of the wireless terminal. The method also comprises presenting a list of the obtained identifiers in a user interface of the wireless terminal. The method also comprises, after the presenting, receiving input via the user interface. The method also comprises, in response to the received input, associating at least a first BA device of the plurality of BA devices with at least a second BA device of the plurality of BA devices.

According to another aspect of the present invention, there is provided a wireless terminal for installation of BA devices in a building. The wireless terminal comprises processor circuitry, and storage storing instructions executable by said processor circuitry whereby said wireless terminal is operative to, by means of a localization application in the wireless terminal, determine a current location of the wireless terminal in the building. The wireless terminal is also operative to, from a BA device database, obtain an identifier for each of a plurality of the BA devices which should be installed in the vicinity of the determined location of the wireless terminal. The wireless terminal is also operative to present a list of the obtained identifiers in a user interface of the wireless terminal. The wireless terminal is also operative to, after the presenting, receive input via the user interface. The wireless terminal is also operative to, in response to the received input, associate at least a first of the plurality of BA devices with at least a second of the plurality of BA devices.

According to another aspect of the present invention, there is provided a computer program product comprising computer-executable components for causing a wireless terminal to perform an embodiment of the method of the present disclosure when the computer-executable components are run on processor circuitry comprised in the wireless terminal.

According to another aspect of the present invention, there is provided a computer program for installation of BA devices in a building. The computer program comprises computer program code which is able to, when run on processor circuitry of a wireless terminal, cause the wireless terminal to, by means of a localization application in the wireless terminal, determine a current location of the wireless terminal in the building. The code is also able to cause the wireless terminal to, from a BA device database, obtain an identifier for each of a plurality of the BA devices which should be installed in the vicinity of the determined location of the wireless terminal. The code is also able to cause the wireless terminal to present a list of the obtained identifiers in a user interface of the wireless terminal. The code is also able to cause the wireless terminal to, after the presenting, receive input via the user interface. The code is also able to cause the wireless terminal to, in response to the received input, associate at least a first of the plurality of BA devices with at least a second of the plurality of BA devices.

According to another aspect of the present invention, there is provided a computer program product comprising an embodiment of the computer program of the present disclosure and a computer readable means on which the computer program is stored.

By means of the wireless terminal, e.g. a smartphone, knowing its own location, e.g. with high precision such as with a precision of less than 1 metre or of 0.1 metre, the wireless terminal, or the BA device database (DB) which it is in communication with, may filter out only the BA devices which are to be installed in the vicinity of the wireless terminal in accordance with a BA plan, and present them as a list or the like on a display, e.g. a touchscreen, of a user interface of the wireless terminal. The installer (a person and user of the wireless terminal) may then use this list to find and install the correct BA devices in accordance with the plan. After the installer having physically installed the BA devices in the correct positions, the installer may input a command to confirm this via the user interface, e.g. by means of a button or the touchscreen of the user interface. Then, the wireless terminal may act for, or assist the installer in, configuring the BA devices, e.g. with security credentials and/or communication paths, based on their locations and/or types or technology. The BA devices may then be commissioned in the BAS of the building.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

FIG. 1 schematically illustrates an embodiment of a building 1 comprising an area/volume 2, e.g. a room or the like, in which a plurality of BA devices 4 are to be installed. The BA devices may be part of a BAS of the building. The wireless terminal 3 is configured for performing an embodiment of the method discussed herein for installing and configuring the BA devices. To simplify the figure, only two BA devices 4 are shown, a first BA device 4a and a second BA device 4b. The BAS may also comprise a BMS comprising a controller 5, for controlling the BA devices after commissioning but also for assisting the installer with installation and configuration of the BA devices via the wireless terminal 3. The BMS may also comprise the BA device DB 6 which holds information about the BA devices to be installed in accordance with the installation plan of the BAS. The information may typically comprise installation coordinates and an identifier, e.g. a media access control (MAC) address, of each BA device to be installed.

Figure 2:
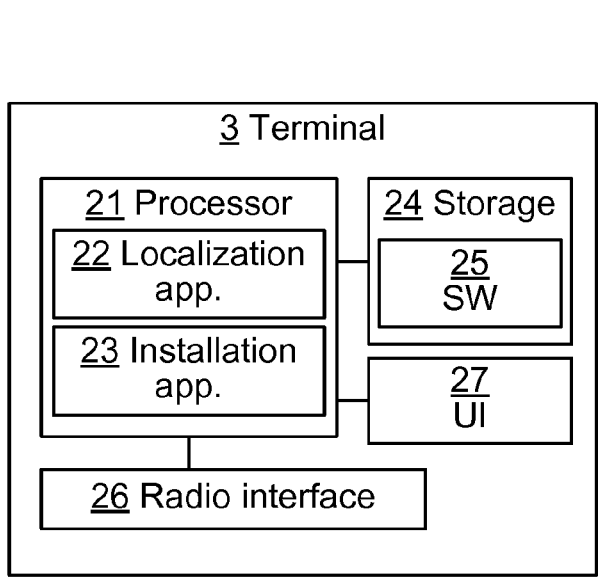
FIG. 2 is a schematic block diagram of an embodiment of a wireless terminal of the present invention.

FIG. 2 schematically illustrates an embodiment of a wireless terminal 3 of the present invention. The wireless terminal may be any mobile radio device or user equipment (UE), enabled to communicate over a radio channel in a communication network, for instance but not limited to e.g. mobile phone, smartphone, tablet computer, laptop, or the like, preferably a smartphone.

The wireless terminal 3 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 25 stored in a storage 24 of one or several storage unit(s) e.g. a memory. The SW may e.g. comprise computer programs for, when run in the processor circuitry 21, forming the localization application (app) 22 as well as an installation app 23, enabling the terminal 3 to perform an embodiment of the method of the present disclosure. The storage unit is regarded as a computer readable means as discussed herein and may e.g. be in the form of a Random Access Memory (RAM), a Flash memory or other solid state memory, or a hard disk, or be a combination thereof. The processor circuitry 21 may also be configured to store data in the storage 24, as needed. The wireless terminal 3 also comprises a radio interface 26 comprising a transmitter, a receiver and an antenna, which may be combined to form a transceiver or be present as distinct units within the wireless terminal 3. The radio interface 26 may e.g. be for connecting the terminal 3, and allowing communication with, the DB 6 and, optionally, the control 5. The wireless terminal also comprises a user interface (UI) 27 for allowing interaction with the installer. The UI may e.g. comprise touch screen and/or a display in combination with buttons, for input and output.

According to an aspect of the present invention, there is provided a wireless terminal 3 for installation of BA devices 4 in a building 1. The wireless terminal comprises processor circuitry 21, and storage 24 storing instructions 25 executable by said processor circuitry whereby said wireless terminal is operative to, by means of a localization application 22 in the wireless terminal, determine a current location of the wireless terminal in the building. The wireless terminal is also operative to, from a BA device database 6, obtain an identifier for each of a plurality of the BA devices which should be installed in the vicinity of the determined location of the wireless terminal. The wireless terminal is also operative to present a list of the obtained identifiers in a user interface 27 of the wireless terminal. The wireless terminal is also operative to, after the presenting, receive input via the user interface 27. The wireless terminal is also operative to, in response to the received input, associate at least a first 4a of the plurality of BA devices with at least a second 4b of the plurality of BA devices.

According to another aspect of the present invention, there is provided a wireless terminal 3 for installation of BA devices 4 in a building 1. The wireless terminal comprises means (e.g. the a localization application 22) for determining a current location of the wireless terminal in the building. The wireless terminal also comprises means (e.g. the radio interface 26) for, from a BA device database 6, obtaining an identifier for each of a plurality of the BA devices which should be installed in the vicinity of the determined location of the wireless terminal. The wireless terminal also comprises means (e.g. the UI 27) for presenting a list of the obtained identifiers. The wireless terminal also comprises means (e.g. the UI 27) for, after the presenting, receiving input. The wireless terminal also comprises means (e.g. the radio interface 26) for, in response to the received input, associating at least a first BA device of the plurality of BA devices with at least a second BA device of the plurality of BA devices.

Figure 3:
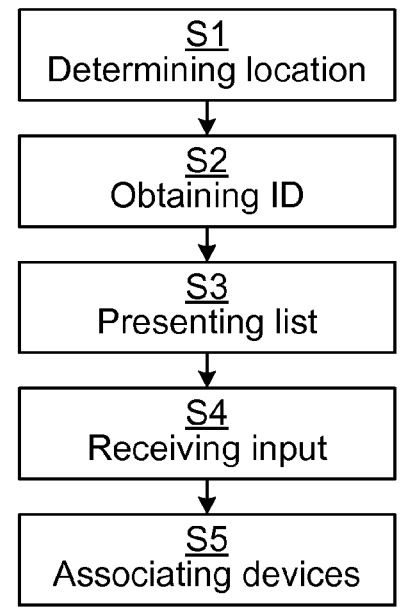
FIG. 3 is a schematic flow chart of an embodiment of the method of the present invention.

FIG. 3 is a schematic flow chart of an embodiment of the method of the present invention. The method is performed by a wireless terminal 3 for installation of BA devices 4 in a building 1. The method comprises, by means of a localization application 22 in the wireless terminal 3, determining Si a current location of the wireless terminal in the building. The method also comprises, from a BA device database 6, obtaining S2 an identifier for each of a plurality of the BA devices 4 which should be installed in the vicinity of the determined Si location of the wireless terminal 3. The method also comprises presenting S3 a list of the obtained S2 identifiers in a user interface 27 of the wireless terminal 3. The method also comprises, after the presenting S3, receiving S4 input via the user interface 27. The method also comprises, in response to the received S4 input, associating S5 at least a first 4a of the plurality of BA devices with at least a second 4b of the plurality of BA devices.

In some embodiments, the associating S5 comprises assigning the first and second BA devices 4a and 4b with the same security credentials. It may be convenient to use the same security credentials for devices 4 which are close to each other or otherwise paired/associated with each other.

Additionally or alternatively, in some embodiments, the associating S5 comprises assigning the first and second BA devices with communication parameters such that the first BA device 4a is able to communicate via the second BA device 4b in accordance with a communication standard. The communication properties may e.g. configure routing/communication paths within the BAS, e.g. in accordance with a desired Quality of Service (QoS). The communication properties may e.g. include routing information, as well as an identifier (ID) of the next hop node for a particular destination according to desired QoS. The first BA device 4a may e.g. communicate with the BMS, such as the control 5, via the second BA device 4b. In some embodiments, the communication standard is any of ZigBee, KNX (an OSI-based network communications protocol for intelligent buildings), Digital Enhanced Cordless Telecommunications (DECT) Ultra Low Energy (ULE), Thread (an IPv6-based protocol for smart household devices to communicate on a network), EnOcean (an energy harvesting wireless technology used in building automation systems), and 6LOWPAN (Internet Protocol version six (IPv6) over Low power Wireless Personal Area Networks). These are communication technologies which may be conveniently used in BA.

The terminal 3 may advantageously determine its position with a high accuracy localization technique such as Ultra Wide Band (UWB) radio technology, but other technologies, e.g. a satellite navigation technology such as Global Positioning System (GPS) or a cellular Radio Access Network (RAN) positioning technique, are also contemplated. Thus, in some embodiments, the localization application 22 is configured for determining Si the current location of the wireless terminal 3 by means of UWB.

In some embodiments, the obtaining S2 also comprises obtaining coordinates for where each of the plurality of BA devices 4 should be installed. Conveniently, the DB 6 also comprises information about the exact coordinates for installation each of the BA devices to aid the installer in the installation. In some embodiments, the coordinates for each of the plurality of BA devices 4 are within a radius of two metres of the determined Si location, e.g. within a radius of 1 or 0.5 metres. This implies how hard the BA devices of the DB 6 are filtered before displayed by the terminal 3.

In some embodiments, the identifier is a media access control, MAC, address. However, in other embodiments, the identifier may be any other code or address which identifies a BA device 4. For instance, the identifier may in some embodiments comprise the installation coordinates of the BA device.

In some embodiments, each of the plurality of BA devices 4 has a functionality for an arrangement chosen from the group consisting of: light switch, dimmer, lamp, security system, air conditioning, heating and ventilation or other sensors or actutators used in BA, or other arrangements comprised in the BAS.

In some embodiments, the wireless terminal 3 may be any type of commissioning device, but may preferably be a mobile phone e.g. a smartphone.

Embodiments of the present invention may be conveniently implemented in the wireless terminal 3, including one or more processors 21, memory 24 and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions 25 stored thereon/in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

EXAMPLE

The wireless terminal 3 has a localization app 22 that determines its current location. The wireless terminal 3 has an installation app 23 that list the nearby BA devices 4 that should be located in the vicinity of the terminal (the devices may or may not be already mechanically installed). The installation app 23 in the terminal will enable the BA devices located physically close to each other to be paired, and/or configured to communicate over fewer hops, and/or configured with common security credentials for further communication.

During commissioning, the installer uses the wireless terminal, e.g. a smartphone which determines its own position using high accuracy localization techniques, such as localization based on UWB, which provides 10 cm level accuracy.

Once the wireless terminal 3 has determined its position, an installation application 23 in the wireless terminal will list MAC addresses of the BA devices 4 that should be located physically close to each other in the vicinity of the wireless terminal's current position according to the information in a BA device database 6 which stores the installation coordinates of the devices as well as their MAC address. The installer uses the MAC addresses and coordinates information to install the BA devices in correct positions if they are not installed yet, and double check the correctness of the installation if the devices are already installed. After installing the devices in correct locations based on their MAC addresses, the installer will pair physically close devices or configure them to communicate over fewer hops by means of the installation application 23 in the mobile device. The wireless terminal will assign common security credentials, such as a shared group key, based on the location of the BA devices so that only BA devices located close by can correspond with each other.

The present disclosure has mainly been described above with reference to a few embodiments. However, as is readily appreciated by a person skilled in the art, other embodiments than the ones disclosed above are equally possible within the scope of the present disclosure, as defined by the appended claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method performed by a wireless terminal for installation of Building Automation (BA) devices in a building, the method comprising:
    determining, using a localization application in the wireless terminal, a current location of the wireless terminal in the building;
    from a BA device database, and based on the determined current location, obtaining an identifier for each of a plurality of the BA devices which should be installed in a vicinity of the determined location of the wireless terminal;
    presenting a list of the obtained identifiers in a user interface of the wireless terminal;
    after the presenting, receiving input via the user interface; and
    in response to the received input, associating at least a first of the plurality of BA devices with at least a second of the plurality of BA devices,
    wherein the associating comprises assigning the first and second BA devices with communication parameters such that the first BA device is configured to communicate via the second BA device in accordance with a communication standard, and
    wherein the plurality of the BA devices which should be installed is based on the determined current location and only such BA devices are presented in the list.

2. The method of claim 1, wherein the associating comprises assigning the first and second BA devices with common security credentials comprising a shared group key such that at least one of the first and second BA devices can only directly communicate with the other of the first and second BA devices.

3. The method of claim 1, wherein the associating comprises assigning the first and second BA devices with communication parameters such that the first BA device is able to directly communicate with the second BA device.

4. The method of claim 1, wherein the obtaining further comprises obtaining coordinates for where each of the plurality of BA devices should be installed.

5. The method of claim 4, wherein the coordinates for each of the plurality of BA devices are within a radius of two meters of the determined location.

6. The method of claim 1, wherein the identifier comprises a media access control (MAC) address.

7. The method of claim 1, wherein each of the plurality of BA devices has a functionality for an arrangement chosen from the group consisting of: light switch, dimmer, lamp, security system, air conditioning, heating, and ventilation.

8. The method of claim 1, wherein the wireless terminal comprises a mobile phone.

9. A wireless terminal for installation of Building Automation (BA) devices in a building, the wireless terminal comprising:
    processor circuitry; and
    storage storing instructions executable by the processor circuitry whereby the wireless terminal is configured to:
    using a localization application in the wireless terminal, determine a current location of the wireless terminal in the building;
    from a BA device database, and based on the determined current location, obtain an identifier for each of a plurality of the BA devices which should be installed in a vicinity of a determined location of the wireless terminal;
    present a list of the obtained identifiers in a user interface of the wireless terminal;
    after the presenting, receive input via the user interface; and
    in response to the received input, associate at least a first of the plurality of BA devices with at least a second of the plurality of BA devices.

10. A non-transitory computer program product comprising computer-executable components configured to cause the wireless terminal to perform the method of claim 1 when the computer-executable components are run on processor circuitry of the wireless terminal.

11. A non-transitory computer readable medium comprising a computer program for installation of Building Automation (BA) devices in a building, the computer program comprising computer program code which is configured to, when run on processor circuitry of a wireless terminal, cause the wireless terminal to:
    using a localization application in the wireless terminal, determine a current location of the wireless terminal in the building;
    from a BA device database, and based on the determined current location, obtain an identifier for each of a plurality of the BA devices which should be installed in a vicinity of the determined location of the wireless terminal;
    present a list of the obtained identifiers in a user interface of the wireless terminal;
    after the presenting, receive input via the user interface; and
    in response to the received input, associate at least a first of the plurality of BA devices with at least a second of the plurality of BA devices.

12. A non-transitory computer program product comprising a computer program according to claim 11.

13. The method of claim 5, wherein the coordinates for each of the plurality of BA devices are within a radius of 1 meter of the determined location.

14. The method of claim 13, wherein the coordinates for each of the plurality of BA devices are within a radius of 0.5 meters of the determined location.

15. The method of claim 8, wherein the mobile phone comprises a smartphone.

* * * * *